United States Patent [19]

Steely

[11] 4,206,318
[45] Jun. 3, 1980

[54] INTRAPLANT COMMUNICATION SYSTEM
[75] Inventor: Lee W. Steely, East Cocalico Township, Lancaster County, Pa.
[73] Assignee: Gai-Tronics Corporation, Reading, Pa.
[21] Appl. No.: 916,910
[22] Filed: Jun. 19, 1978
[51] Int. Cl.² .............................................. H04M 1/00
[52] U.S. Cl. .................................. 179/1 A; 179/159; 455/89
[58] Field of Search .................. 179/159, 167, 1 SW, 179/1 A, 1 HS, 103; 325/16

[56] References Cited
U.S. PATENT DOCUMENTS

| | | | |
|---|---|---|---|
| 2,673,252 | 3/1954 | Henrikson | 179/159 |
| 3,489,860 | 1/1970 | Greenman et al. | 179/167 |
| 3,527,890 | 9/1970 | Radomski | 179/1 A |
| 3,573,620 | 4/1971 | Ashley | 325/16 |
| 4,079,201 | 3/1978 | Scott et al. | 179/7.1 R |

Primary Examiner—Malcolm A. Morrison
Assistant Examiner—E. S. Kemeny
Attorney, Agent, or Firm—William J. Ruano

[57] ABSTRACT

This invention is an improvement of the intraplant communication system in U.S. Pat. No. 3,527,890. It comprises one base unit composed of a handset amplifier and speaker amplifier, each with its own integral power supply and each located on a common printed circuit board. This unit also features a disconnect device, formerly called a hook switch, which includes a radio frequency proximity detector which has no moving parts.

7 Claims, 13 Drawing Figures

INTRAPLANT COMMUNICATION SYSTEM

This invention relates to an intraplant voice communication system and which is an improvement over that covered by U.S. Pat. No. 3,527,890, assigned to the present assignee. The present system comprises a handset amplifier and a speaker amplifier housed in one enclosure complete with a mechanical disconnect facility to electrically remove it from the interconnecting communication cable. One D-C power supply is used to power both amplifiers. This completed assembly forms one communication station. While the circuitry of the new unit has been drastically changed from that disclosed in said patent, these units remain compatible and interchangeable with those in the patented system and may be added to such system.

The new system constitutes a significant improvement over said prior patented system since it provides a novel unit which eliminates the mechanical disconnect system and replaces it with a system which has no moving parts. The new system increases reliability and ease of manufacture, while reducing cost.

Additionally, the electronic circuits have been completely redesigned to include the latest integrated circuits and to effect significant improvements in the following areas:
1. sidetone performance on long communication lines
2. System performance with multiple stations in use simultaneously on the same communication line
3. more uniform system operation despite loudness variations created by differences in people's voices or by ambient noise conditions Other objects and advantages will become more apparent from a study of the following descriptions, taken with the accompanying drawings wherein:

Figure 1:
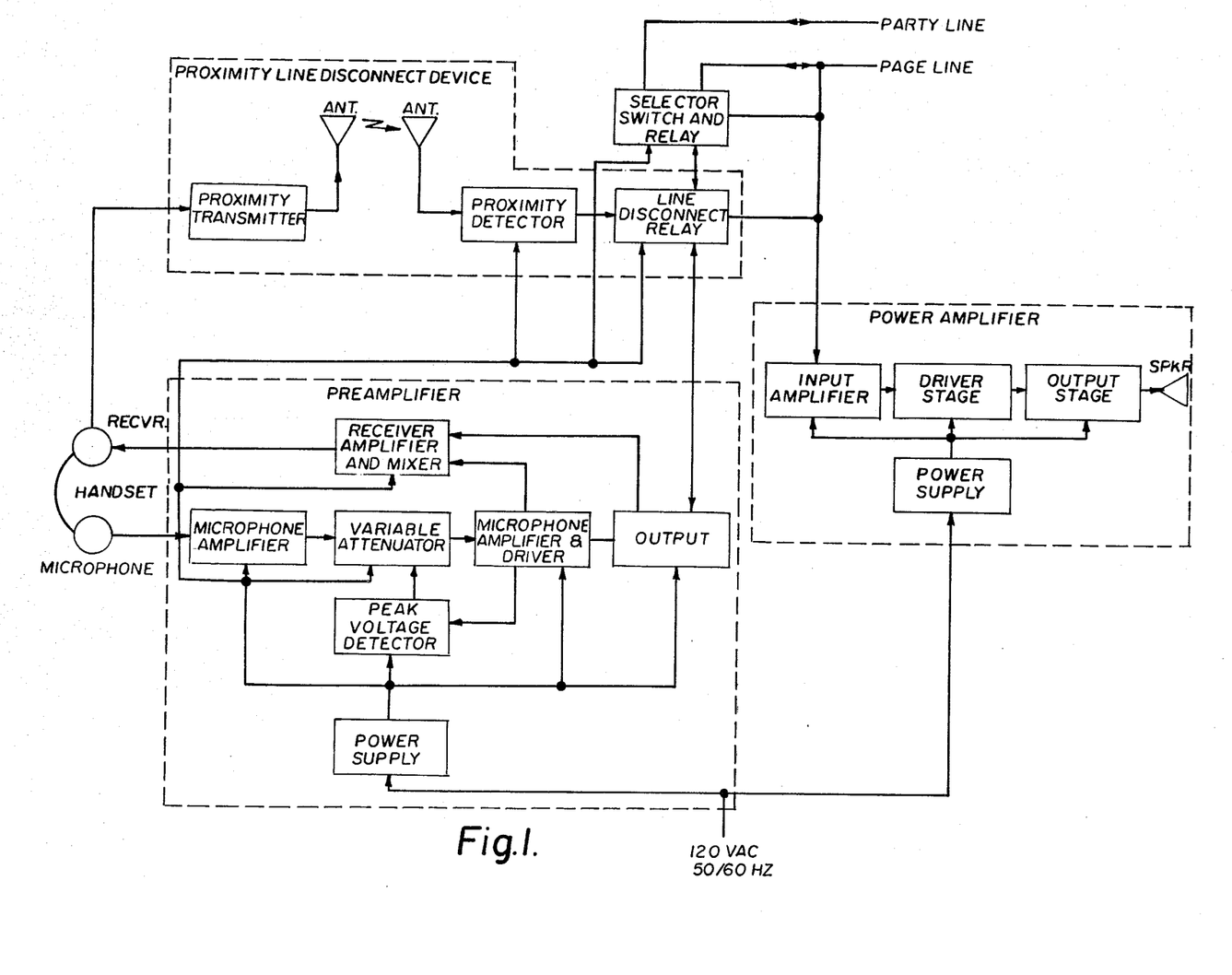
FIG. 1 is a block diagram illustrating the component parts of a communication station embodying the present invention.

Referring more particularly to FIG. 1, it will be noted that the invention relates to a communications station composed of a handset with a microphone interfaced to a page line or a party line through the necessary electronic circuitry, including handset proximity detection and selector switching. Said handset also contains a receiver interfaced to said page or party line. In addition, all handset page or party line circuitry is powered by an independent D-C power supply. Said communication station also contains signal power amplifier to interface said page line to a speaker. All signal power amplifier circuitry is powered from another independent D-C power source.

These components will now be more fully described by the major section referred to in the circuit block diagram shown in FIG. 1.

PROXIMITY LINE DISCONNECT DEVICE

One of the disadvantages of the present device, which employs a mechanical hook switch, involves the long-term reliability of said hook switch. It has been my experience that in severe environments typically encountered by present equipment, that moisture or other corrosive agents cause the hook switch to "freeze up" or become inoperative. While it is not a major problem with such equipment, nevertheless, it is a nuisance problem, particularly to field personnel who are responsible for repairing the equipment.

There is a two-fold benefit to the non-mechanical hook switch employed in the present invention. First, the long-term reliability is greatly increased because there are no moving parts. Hence, water and corrosive atmospheres cannot interfere with the line disconnect device. Secondly, the new system can tolerate considerably more physical abuse by the operator of the equipment than is presently possible.

The non-mechanical line disconnect device employed in the present invention (FIG. 6) uses a RF transmitter 10 located behind the receiver 8 in the handset 2. This transmitter is tuned to approximately 39 Khz and the signal that it generates is connected by wire 11 to the metal housing 9 of the receiver 8, which, in turn, acts as a radiating antenna. The signal, which is generated by this transmitter when in the close proximity of the hang-up hook 3, is detected by a special phase locked loop detector in the preamplifier and, upon detection of said signal, operates a relay which disconnects the preamplifier from the page or party line. The epoxy-coated metal handset hang-up hook 3 is insulated from the front panel 1 by insulating washer 12 and rigidly mounted on said front panel by metal screw 14. Signals are carried away by wire 13. Electrical connections are then made from the metal of this handset hook to the detector circuitry located inside the preamplifier. Thus, the hang-up hook acts as a receiving antenna to the radiated signal generated by the handset and, when said handset comes into close proximity to the hang-up hook, the presence of the 39 Khz radio-frequency signal is detected and the disconnect mechanism is actuated.

However, there are several other schemes that could be employed in this disconnect mechanism. The same function could be accomplished by embedding a magnet 2a (FIG. 7) in the receiver area of a handset 2. This would act as a transmitting element. In addition, a receiver device, either composed of a hull effect, semiconductor device or a reed switch 1b, could be embedded or configured in the receiving hook 3. Thus, close proximity of the magnet to either of these devices could operate a relay or similar disconnect mechanism.

Figures 6, 6A, 7, 8, 9, 10:
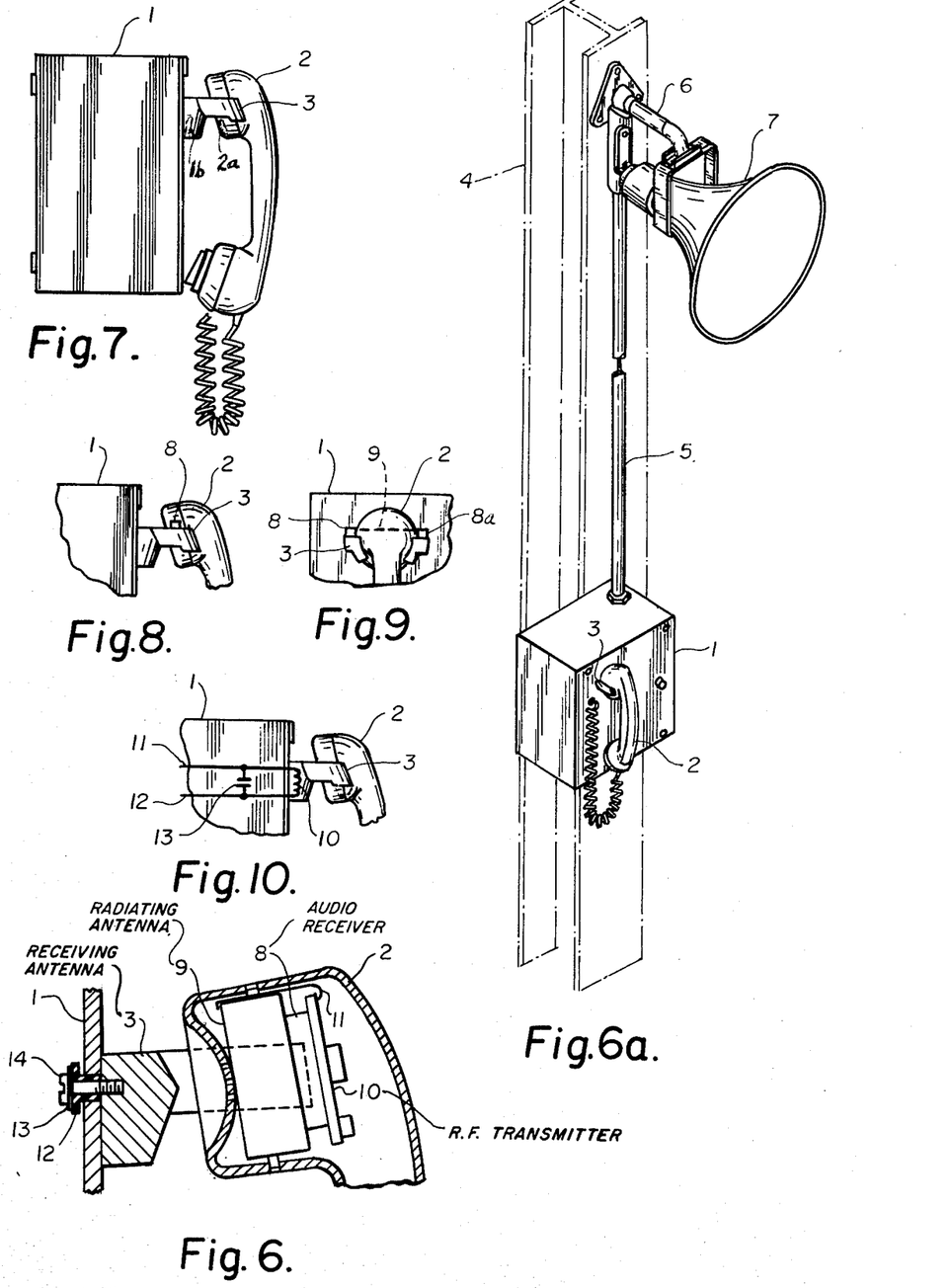
FIG. 6 is a sectional view of the hook and receiver embodying the present invention.
FIG. 6a is a perspective view of the hook, receiver and associated speaker 7 mounted on frame 4 and interconnected through conduits 5 and 6.
FIG. 7 is a side view of the hook and receiver of FIG. 6 showing a modification.
FIGS. 8 and 9 are fragmentary front and side views of the hook and receiver of FIG. 6 showing a modification.
FIG. 10 is a fragmentary side view of the hook and receiver embodying a further modification.

Another approach, shown in FIG. 8, might employ the transmission and detection of light. For example, a light transmitter 8 could be affixed to one ear of the hang-up hook 3 and a light detector 8a could be placed on the other ear of said hang-up hook. Thus, anytime the handset 2 is placed in its normal position on the hang-up hook, it would break the light beam 9 being transmitted between the two devices. This could then be detected and used to operate the necessary disconnect mechanism.

Another approach might employ a type of metal detector (FIG. 10). A coil 10 could be embedded in the hang-up hook 3 and resonated with a capacitor 13 to form a tuned circuit. This tuned circuit would, in the presence of metal from, say, the receiver 2 of a handset when placed in the proximity of said coil in the hang-up hook, alter the operating frequency of said resonated circuit. This shift in frequency could then be detected by a phase locked loop or any other scheme and operate the required disconnect mechanism.

In short, any means may be used for detecting relative movement between the handset and hang-up hook.

Figure 2A:
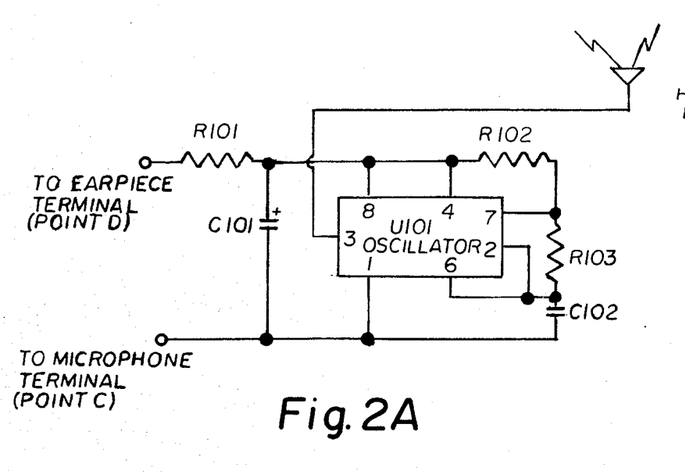
FIGS. 2A and 2B are electronic circuit diagrams of the line disconnect device used in the present invention.
Figure 2B:
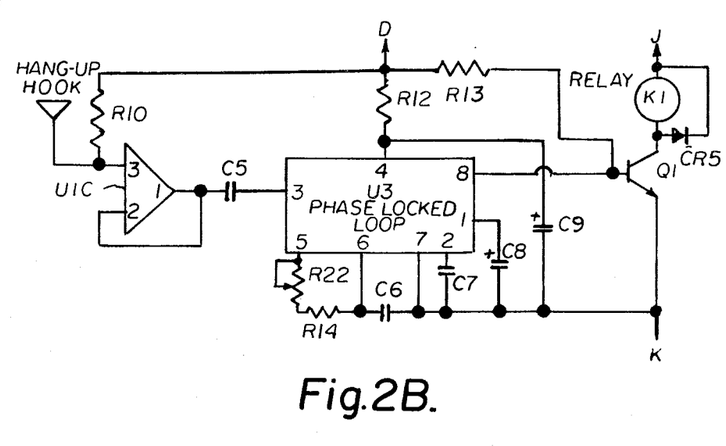

FIGS. 2A and 2B describe in detail the particular circuitry used in the invention to implement the line disconnect device. Since 6.5 volts D-C and 1.5 volts D-C are present in the receiver and microphone circuitry, repsectively, additional circuitry was added in the area of the ear piece in the handset to accomplish the transmit function. These voltages, the difference between them being 5 volts, are used to power the required transmitter. Resistor R101 and capacitor C101 comprise a low-pass filter to develop the required power supply voltage for the integrated circuit timer U101. Resistors R102 and R103, along with capacitor C102, allow the integrated circuit oscillator to operate at 39 Khz. This 39 Khz square wave signal available on pin 3 of U101 is electrically connected to the metal ring 9 (FIG. 6) surrounding the receiver in the handset. This metal ring does not come into contact with any other electrical circuits and functions as the radiation antenna.

Figure 3A:
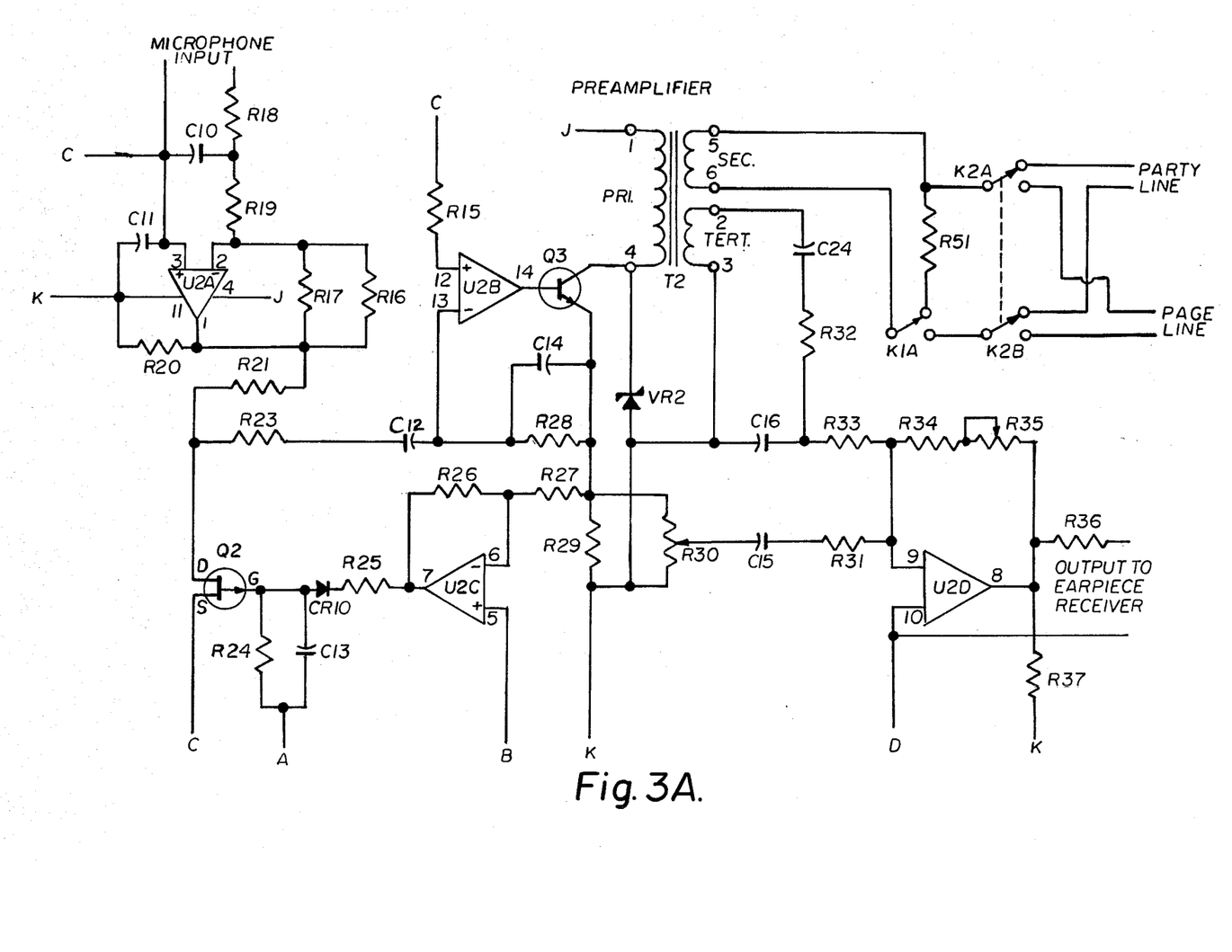
FIG. 3A is an electronic circuit diagram of the preamplifier circuit used in the present invention and FIG. 3B is the power supply thereof.

Detection of the RF signal in FIG. 2B is accomplished by applying any electrical signal in the metal of the hang-up hook into the input buffer amplifier U1C. This amplifier is of the operational amplifier type used as a voltage follower. The purpose of this amplifier is to take the very high impedance circuit of the hang-up hook and translate it into a low impedance circuit. Since operational amplifier U1C has a very low output impedance, it can successfully drive the phase locked loop decoder U3. This device has a specific band width determined by components C7 and C8. When an incoming signal is within that pass band, it will operate an electronic switch which is available on pin 8 of said device. The changing electrical signal available on pin 8 drives the base of transistor Q1, which, in turn, operates relay K1 located in the collector of transistor Q1. The phase locked loop U3 is powered from a low impedance source of 6.5 volts D-C through resistor R12 and C9 which act as a low pass filter to keep extraneous power supply signals out of the phase locked loop. The free running frequency of the phase locked loop is determined by resistors R22 and R14 and capacitor C6. This device also operates at a frequency of roughly 39 Khz and, when any incoming signal to pin 3 of the device is within the capture range or pass band of the internal oscillator of U3, the device acts in such a way as to operate an internal transistor switch which is available on pin 8. Thus, whenever a 38 Khz signal is present on the metal of the hang-up hook, it will operate the relay K1 through the operation of the phase locked loop decoder. The contacts of relay K1 are what specifically connects the output of the preamplifier into either the page or the party line through the contacts of relay K2 (see drawing 3A).

PREAMPLIFIER CIRCUIT

The present design has always suffered a disadvantage in three major areas. Whenever the distance between any given preamplifier and the system 33 ohm load resistor exceeds ¼ mile, severe degradation in the sidetone circuitry is encountered. This circuitry is responsible for lowering the audio level to the ear piece of a station which is transmitting information onto the 33 ohm line without the need of any disconnect mechanism for said ear piece. However, the sidetone circuitry does not reduce the amplitude of any signal received from the 33 ohm line.

The second disadvantage of the present design centers on the fact that the receiving ear piece is indirectly connected to the 33 ohm line. Since the ear piece is a relatively low impedance device (approximately 150 ohms), this indirect connection products a significant loading effect on the 33 ohm line, particularly when several units are simultaneously connected to said line.

The third disadvantage of the present system involves inconsistencies in signal amplitudes on the 33 ohm line resulting from either differing speech levels of individual people using the system, or differing ambient noise levels from individual stations which result in a person speaking very loud from a noisy area and softly from a quiet area.

The new design contains many electronic circuit improvements not found in the present design. One of the primary advantages of the new circuitry involves the almost exclusive use of operational amplifiers of the integrated circuit type. These devices inherently have very high gain associated with them. However, the gain is reduced by external components associated with each individual operational amplifier. Therefore, each stage gain is determined by external components and is completely independent of the characteristics of the operational amplifier. In addition, these devices exhibit a very high temperature stability, principally because the gain associated with each device is independent of that device.

Another improvement of the new design revolved around making the output stage of the preamplifier as close to a constant current source as possible. The principle advantage of this type of source rests in the fact that increased resistance due to interconnect wiring between any given preamplifier and the system's 33 ohm load produced no significant reduction on the voltage across said 33 ohm load.

In order to make the output source look like a constant current, it was necessary to remove as many loads as possible from the output circuitry. In addition to removing loads from the output of the preamplifier, it was necessary to increase the impedance looking back into the output circuitry to make it as high as practically possible. In order to accomplish this, it was necessary to improve the drive transistor circuitry, improve the output transformer, and remove the ear piece from being directly powered by the output of the preamplifier to being driven through an auxiliary amplifier from a small winding in the output transformer of the preamplifier. The advantage of this process is to enable more preamplifier units to be placed in parallel without significantly loading the line.

Another improvement made to the new preamplifier includes the use of a sidetone adjust control. This gives the operator of our equipment the option of adjusting sidetone for optimum performance at a particular station. Thus, it is possible for any given unit to be placed into a complex system and to provide the operator with the ability to uniquely adjust that station for the best performance.

The last major improvement to be discussed herein for the new preamplifier involves the incorporation of automatic gain control in the microphone amplifier circuitry. This feature allows microphone levels beyond a certain sound pressure level to come out of the preamplifier at a fixed level, no matter what the input sound pressure level may be. Thus, very loud voice levels will come out of the preamplifier at the same voltage level as will soft voice levels.

Figure 3B:
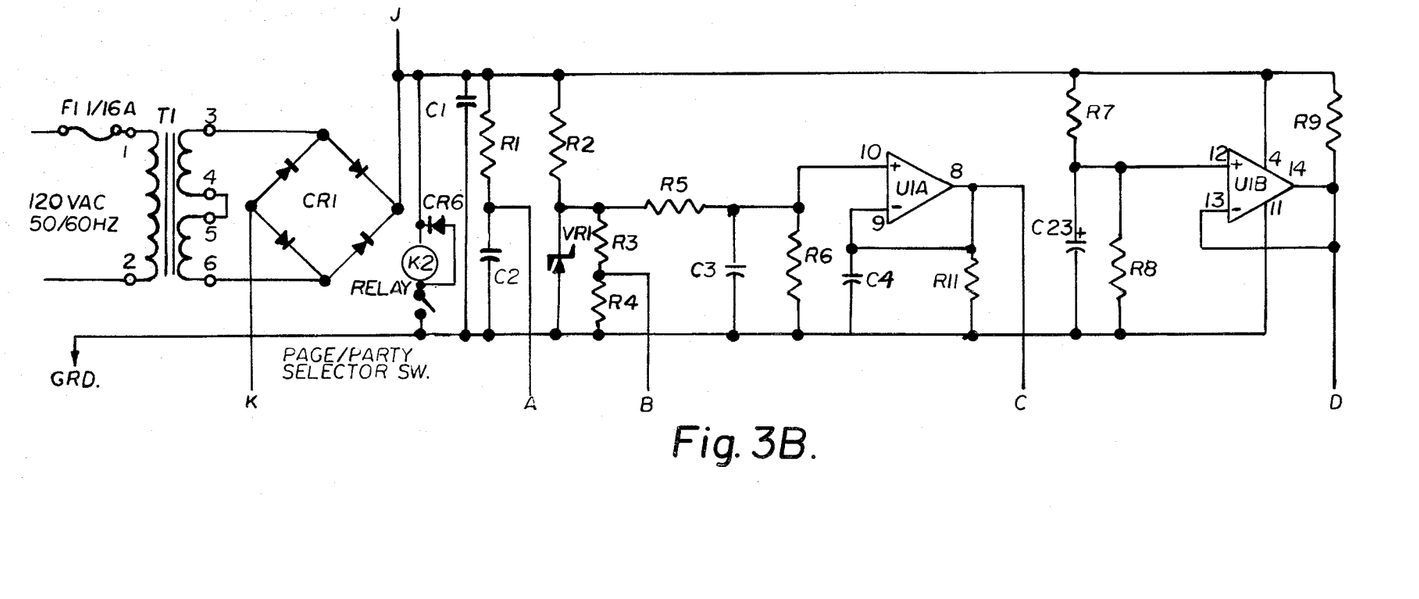

All of these circuits will now be discussed in further detail. Refer to FIG. 3B.

Because integrated circuits have a characteristic called high power supply rejection ratio, it is possible to make a supply to power the preamplifier, which has by normal standards a very high ripple content in its output. Therefore, a very simple capacitive input power supply composed of transformer T1, full wave diode bridge CR1, and input capacitor C1 were employed in the design of this power supply. In addition, four well-filtered bias voltages described by points A, B, C, and D are required in the preamplifier. Of these four, two, namely, points B and C, need to be highly temperature stable. In addition, points C and D must be very low impedance points to bias necessary circuitry in the preamplifier. Temperature stability is achieved through a combination of resistor R2 and zener diode VR1, which is a 4.7 volt zener diode. This particular voltage level of 4.7 volts was chosen because it is a characteristic of zener diodes in this voltage vessel, that the temperature coefficient associated with said zener diode is statistically zero. Thus, the voltage developed across VR1 is a well-filtered, highly temperature stable, voltage source. This voltage is then divided through combination of R3 and R4 to provide a fairly high impedance bias voltage point B to be used in another very high impedance circuit in the preamplifier. In addition, through a combination of resistors R5, R6, and C3, the voltage developed across the zener diode is additionally filtered and reduced in level to produce the necessary bias voltage fed to input pin 10 of operation amplifier U1A, which is used as a voltage follower. The output of this voltage follower is additionally loaded with resistor R11 and capacitor C4 to produce complete stability. Thus, the output of this amplifier produces a highly filtered, highly temperature stable, bias voltage at a very low impedance level. In addition, the raw power supply voltage developed across C1 is divided by a combination of R7 and R8 and filtered by C23 to produce a voltage level approximately one-half of the power supply voltage. This voltage is then fed into another voltage follower, U1B. The output of U1B is additionally loaded with resistor R9 to produce stability. Thus, point D is a highly filtered, low impedance point used for bias in additional circuitry, which will be described later. Additionally, the raw power supply voltage is filtered through R1 and C2 to produce a well-filtered bias voltage equal to the power supply voltage. This is point A, which feeds a very high impedance circuit, also to be discussed hereinafter.

The heart of the preamplifier (FIG. 3A) is composed of operational amplifier gain blocks U2A and U2B. Each being biased at a D-C level determined by point C. Small electrical signals from the microphone are fed into the first amplifier stage through resistors R18 and R19. These resistors, taken together, represent the input impedance of the first amplifier stage. They are chosen such that the sum of the two is approximately ten times the microphone impedance. This provides a fairly high input impedance to the microphone, but yet does not significantly alter the microphone line impedance so that hum pick up is a problem. Additionally, capacitors C10 and C11 function as bypass capacitors to RF signals, such as, citizen band radio.

The gain of the first stage is principally determined by the parallel combination of R16 and R17, divided by the sum of the resistors R18 and R19. The first stage gain is approximately 12. Additionally, R20 acts as a stabilizing load on operational amplifier U2A.

Amplified signals on the output pin of U2A, pin 1, are now fed through R21 and R23 and C12 into the input of U2B. For the moment, assume that the shunt impedance presented by field-effect transistor Q2 does not influence those signals fed from the output of operational amplifier U2A to the input of operational amplifier U2B. The gain of this second stage amplifier composed of operational amplifier U2B is approximately a factor of 20. The feedback resistor for this operational amplifier is R28 and the gain is basically determined by the value of R28, divided by the sum of resistors R21 and R23. It must be noted that the main load resistor for operational amplifier U2B is R29 and the operational amplifier will do whatever it has to do, even though there is a transistor Q3 in series with the output of the operational amplifier, to maintain a voltage across R29, which is approximately 20 times the value of the signal appearing at the output of U2A, pin one. The high frequency response at the second stage is rolled off above 4 KC by the addition of capacitor C14 in parallel with feedback resistor R28. In addition, the low frequency response at the second stage is rolled off below 250 Hz by C12.

The D-C voltage developed across R29 is controlled solely by operational amplifier U2B. Since the input to pin 13 of U2B is capacitively coupled, the stage functions as a unity gain voltage follower to any D-C signal applied to pin 12 of said operational amplifier. Therefore, the output of operational amplifier U2B will do whatever is necessary to maintain the D-C voltage across R29 equal to bias point C. Thus, the D-C voltage developed across R29 and the current through it are well filtered and very temperature stable.

A constant current output source is approximated by virtue of the fact that in the emitter of Q3 we have basically an ideal voltage source developed across R29. Since the current in the emitter circuit is basically the same current that flows in the collector circuit, with the exception of what small additional current is added by the base, the collector circuit approximates a constant current source. Signals in the collector circuit are then coupled through step down transformer T2 into the main output winding available between pins 5 and 6. Signals on this winding, which has an effective source impedance of typically 1000 ohms, are then fed through relay contacts K1A, K2A and K2B to either the internal load resistor R51 or the external load represented by the party line or page line. It will be noted also that in the collector circuit of Q3, there is a zener diode VR2. The purpose of this zener diode is to produce high frequency stability in the collector circuit of Q3 and to prevent accidental breakdown of Q3 due to induced transients from either the party or page circuitry.

Automatic gain control (AGC) is achieved by regulating the peak value of the A-C voltage present across R29. This is accomplished by comparing said peak voltage against reference bias voltage B at the input of operational amplifier U2C. Whenever the signals across R29 begin to approach the same magnitude as reference point B, operational amplifier U2C comes out of positive saturation and alters the charge on capacitor C13 through blocking diode CR10. The resulting charge on capacitor C13 alters the bias on FET Q2. This resulting bias change in the gate circuit of FET Q2 alters the effective impedance between the drain and source leads of the FET. In turn, this produces a shunt impedance between power supply bias point C and the junction of R21 and R23. Hence, any signal present at the junction of R21 and R23 is reduced by virtue of the loading effect of Q2. This reduced signal, then, results in a reduced signal across R29. The net effect of this circuit is to maintain constant levels of signal at R29 whenever the input microphone levels exceed an arbitrary value. Successively higher levels present at the output of U2A, pin 1, are reduced by Q2 at the junction of R21 and R23 so as to maintain a constant voltage at the junction of R21 and R23, which, in turn, keeps the voltage across R29 constant. The AGC attack time of roughly 5 milliseconds is determined by R25 and C13, and the decay time of ¼ second is controlled by the time constant associated with R24 and C13.

Another unique feature of the new design involves the ear piece or receiver drive amplifier composed of operational amplifier U2D. This amplifier acts as a mixer and sums the signals coming into its input from potentiometer R30 and feedback winding on T2 located between pins 2 and 3. This feedback winding is very closely coupled to the output winding between pins 5 and 6. Thus, any signals which appear on the main output winding, appear between pins 2 and 3, but they are reduced in amplitude by roughly a factor of 3. Under normal conditions, potentiometer R30 is adjusted so that during your own transmission, minimum signal is noted in your own ear piece. When so adjusted, the signal that appears on the wiper arm of the potentiometer R30, and fed through C15 and R31, is exactly the same amplitude but 180° out of phase with the signal fed to the same pin of operational amplifier U2D through the feedback winding C24, R32 and R33. Thus, there is no net resulting signal at the input to this amplifier and, hence, there is no signal produced in the output. However, when signals appear on the party line due to another preamplifier, said signal is coupled into the feedback winding between pins 2 and 3 and fed down through C24, R32 and R33 into the ear piece amplifier U2D. At this time there is no corresponding signal developed across R30 because one is not talking into the microphone. Therefore, any signal appearing on the feedback winding due to another preamplifier is amplified by U2D because it has no opposing signal. Thus, signals in the ear piece of a given preamplifier station are greatly reduced due to signals being transmitted by said preamplifier. However, signals received from another preamplifier are not in any way reduced by the mixer circuitry. The level of sound in the ear piece or receiver is adjusted by potentiometer R35, which is located in the feedback circuit of operational amplifier U2D.

It should be noted that capacitors C15 and C16 are employed specifically for compensating the mixer circuitry to cancel the effects of the feedback winding on transformer T2 so as to achieve optimum sidetone rejection over all frequencies and under all varying load conditions.

In addition, Resistor R51 is employed in the circuitry of this unit because it is necessary to put a load on the preamplifier when it is in the "on-hook" state. Since the device has a constant current source output, it would produce high voltage levels on the output winding between pins 5 and 6 if no load were placed between said pins and, in fact, oscillate. Therefore, R51 was added to give an arbitrary load during this "on-hook" condition.

It should be noted that the ear piece amplifier U2D is D-C biased at point D, which is roughly one-half the power supply. This is done to provide optimum A-C signal swing available to drive the ear piece receiver.

POWER AMPLIFIER

The power amplifier of the old design suffers three primary disadvantages. First, the input impedance of the power amplifier is approximately 10,000 ohms. However, when 300 to 500 of these units are placed on a given page line, the resulting impedance is sufficiently low to upset the quality of the message transmitted over them. Specifically, this low impedance effects the sidetone performance of said pre-amplifier and associated power amplifier.

A second problem of the old design concerns the specific way in which the output transistors are D-C biased. Variations between thermister resistance and the base emitter voltages on the output transistors used can cause rather severe cross-over distortion problems. This evidences itself as a raspy sound encountered at very low power amplifier drive levels. Typically, it introduces very objectionable distortion when background music is fed into the system.

The third problem encountered with the present design is simply the cost of the very large power transformer that is used to power the amplifier. The existing design takes the line voltage, puts it through a transformer, rectifies it, and filters it. But this transformer is fairly costly and adds considerable weight to the unit.

There are four major areas of improvement in the new design over the older design in the power amplifier area. First, the input impedance of the new circuit is roughly five times that of the existing circuit. This is accomplished by improving the quality of transformer T3 and increasing the input impedance of the power amplifier.

In addition, the new amplifier is directly operated from the power line; incoming 110 volts A-C is half-wave rectified and filtered. A bias source is also developed within the power supply to drive internal circuitry. The entire power supply is composed of only six components.

Included in the new design is a much improved mechanism for biasing of the output transistors. This scheme involves tying both bases of the output transistors together and controlling these bases indirectly through an operational amplifier. The high gain capability of the operational amplifier is used to very quickly drive one output transistor into cut off and drive the other output transistor into conduction. In so doing, the cross-over distortion is greatly minimized. Finally, an improved heat-sinking scheme has been utilized in the new design. This arrangement allows for each transistor to be heat-sinked to an integral board-mounted heat dissipator without the need of connecting that heat dissipator to the enclosed chassis, which is necessary on the present design. This allows the entire printed circuit board to contain everything associated with the preamplifier and power amplifier of a single communication station. This greatly facilitates assembly and disassembly of the unit, and there is no longer any need to unsolder transistor leads from the chassis to remove the printed circuit boards from a unit.

Figure 4:
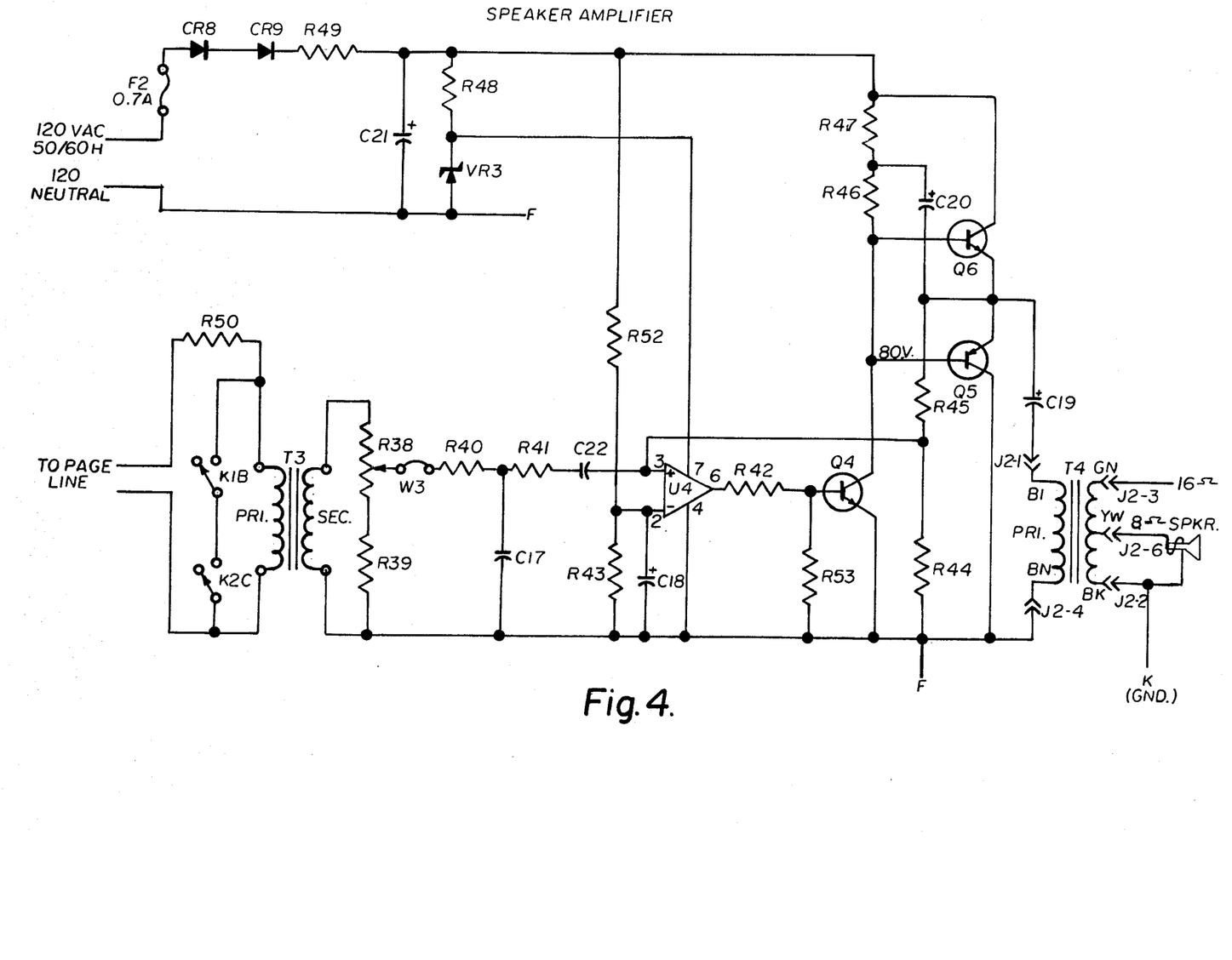
FIG. 4 is an electronic circuit diagram of the power amplifier embodying the present invention.

These improvements will now be analyzed in greater detail. Refer to FIG. 4.

The halfwave rectified power supply is composed of diodes, CR8 and CR9, current in rush limiting resistor R49 and capacitor C21. This power supply is directly driven from the power line and during each positive halfwave of the power line voltage capacitor C21 is charged up to the peak value of said power line voltage. Two diodes are used in this supply to increase the reverse voltage breakdown due to transients that might be imposed on the power line. With the two diodes as shown, the reverse breakdown capability is typically in excess of 3000 volts. Additionally, resistor R48 and zener diode VR3 constitute a well-filtered, lower voltage, low impedance internal bias supply.

A-C signals present on the page line are fed to the primary of stepdown transformer T3. The secondary of said power transformer contains volume adjust potentiometer R38. The desired portion of the incoming A-C signal is then fed to operational amplifier U4 through series resistors R40 and R41 and C22, which functions as a low-frequency roll-off capacitor with a break point at roughly 250 Hz. Capacitor C17 functions as a high-frequency bypass capacitor and rolls off frequencies above 4 Khz. A-C signals present at the input to U4 are amplified by U4 and, in turn, drive transistor Q4 through R42 and R53. Q4, in turn, drives either Q6 or Q5 output transistors. Resistors R46 and R47 provide the power necessary to drive said output transistors. The signal available at the emitters of Q5 and Q6 are then capacitively coupled through C19 to the output transformer T4. T4 is a stepdown transformer which translates the signal in the primary circuit to usable signals on the speaker lines. It should also be noted that capacitor C20 acts as a bootstrap capacitor to enable transistor Q6 to be driven very close to positive saturation; without this capacitor, sufficient based drive is not maintained during peak dynamic signal conditions required by Q6. It should be noted that the feedback for operational amplifier U4 is developed directly from the emitters of Q5 and Q6 and fed directly back into the input of U4 through R45 and R44. Thus, the gain of this operational amplifier and transistor combination is such that the overall gain from the potentiometer R38 to the output of the transistors is determined by the ratio of R45 and the sum of R40 and R41. Therefore, the operational amplifier must do whatever it needs to, to maintain a fixed ratio between the emitters of Q5 and Q6 and the input signal developed across the potentiometer R38. For example, during the period of time where dynamic signal conditions require that Q6 shut off and Q5 turn on, the feedback loop is disconnected because both base emitter junctions for at least a period of time are no longer conducting. Whenever the operational amplifier loses the feedback signal, it immediately goes into an open loop gain situation which is a very high gain condition. In effect, this means a very rapid transition from conduction of one transistor to the other and this greatly reduces cross-over distortion.

Operational amplifier U4 is biased at approximately 1/10 the available power supply voltage by a combination of resistors R52 and R43. This proportional signal is very well filtered by capacitor C18 and becomes the D-C reference input to pin 2 on operational amplifier U4. Since the A-C signals are capacitively coupled to the input of the operational amplifier, D-C conditions are, therefore, determined by other circuitry. The combination of R45 and R44 in the output produces output D-C bias stabilization. Again, the operational amplifier output on pin 6 of U4 will control transistor Q4 and, in turn, Q6 in whatever manner it needs to so as to produce the same voltage at the junction of R45 and R44 as exists on pin 2 of operational amplifier U4. Thus, the D-C output voltage on the emitters of Q5 and Q6 can be biased at ½ the power supply voltage by virtue of the particular resistors used.

MECHANICAL PACKAGING

Figure 5:
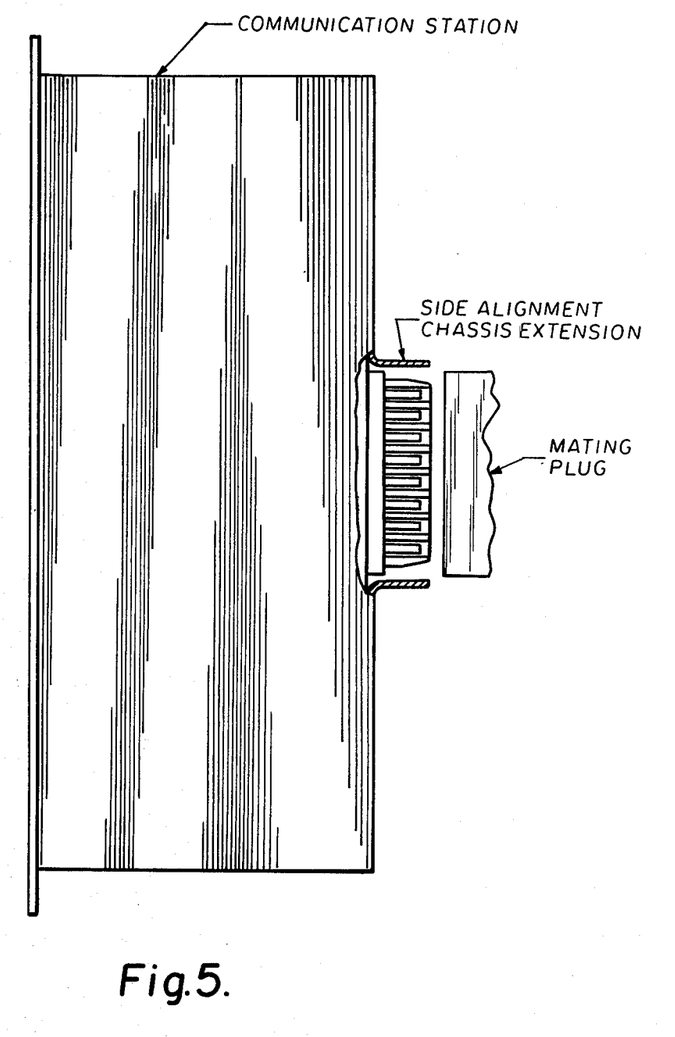
FIG. 5 is a mechanical diagram of the connector alignment extension added to the chassis used in the present invention.

One of the major problems encountered with the present design of the plug-in communication station involves damage of the plug or receptacle that form the connector due to abuse in field installation and maintenance procedures. The plug can be damaged in shipment or handling because it must of necessity protrude from the rear surface of housing. Contacts on the mating receptacle can be damaged by forceful insertion of the plug when mis-aligned. There are raised separators between sliding contacts on the plug which mate to recessed spaces on the receptacle as shown in FIG. 5. When forced to mate when mis-aligned, the raised separator forces the electrical contacts to bend beyond the limit necessary when properly mated. This reduces the tension of the contacts which has led to insufficient contact to assure proper connection.

While the problem could be solved by use of completely different connectors, this invention includes a novel means of preventing this damage while retaining full compatibility with equipment manufactured to the present design.

In an attempt to reduce the problems associated with this connector, the metal work of the chassis, which houses the communication station, was modified to include two protrusions which protect the connector. See FIG. 5. Thus, the new design incorporates simultaneously improvements in plug alignment by adding these two projecting ears on the chassis, as well as reducing the tendency of breakage in shipment of said communication station to and from the field location.

SUMMARY OF PREAMPLIFIER AND POWER AMPLIFIER

The preamplifier output which drives the 33 ohm communication line is controlled by a peak limiting scheme which prevents the preamplifier output from going into clipping distortion. The scheme employed in the present invention automatically reduces the gain of the amplifier so that loud microphone levels produce sinusoidal output signals without distortion, which have the same level as normal speech levels.

Sidetone rejection in the present amplifier is accomplished by mixer summing two electrical signals which, under transmit conditions, are equal but 180 degrees out of place with each other and, therefore, cancel. One of the signals is developed within the electronics of the preamplifier and is proportional to the microphone signal. The other is obtained by coupling the signal on the 33 ohm communication line with a very closely coupled winding on the preamplifier output transformer. The sum of these two signals is then amplified and fed to the earpiece receiver. By driving the earpiece receiver in this unusual manner, the problem of the receiver loading the communication line is eliminated. In addition, by making the first of the two signals previously mentioned variable by turning a potentiometer, it is possible to uniquely tailor the sidetone performance for optimum results on each individual station despite that stations distance from the 33 ohm line load.

The power amplifier of the present invention incorporates a novel approach in biasing of the output transistors. Ordinarily, the output transistors are biased such that a small amount of idle current always flows in the output transistors, in order to minimize cross over distortion which becomes very objectionable at low output volume levels. However, the present amplifier is operated with no current flowing through these transistors; that is, they are in cutoff. Dynamic control of these transistors is accomplished through the use of operational amplifiers which have a very high voltage gain. It is the open loop gain of these amplifiers that provides virtual elimination of cross over distortion.

Thus it will be seen that I have provided a highly efficient and substantially improved intraplant communication system comprising a base unit, including a handset amplifier and speaker amplifier, each with its own integral power supply; also, I have provided a novel disconnect device to replace the common hook switch and which has no moving parts, instead, electronic switching occurs merely as the result of relative movement between the handset and hang-up hook.

While I have illustrated and described several embodiments of my invention, it will be understood that these are by way of illustration only and that various changes and modifications may be contemplated in my invention and within the scope of the following claims.

I claim:

1. A telephone communication system including a station connected thereto comprising two relatively movable elements, namely a handset and a hang-up support for said handset, said handset having an audio receiver in one end and a microphone in the other, said handset and hang-up support containing means devoid of movable switching contacts for proximity detection of movement of said handset relative to said hang-up support, said means comprising a proximity radio frequency transmitter contained in the handset, and a proximity receiving antenna contained in the hang up support, and disconnect relay means activated by a proximity detector responsive to said proximity radio frequency transmitter upon movement of said handset to close proximity to said hang-up support, even without hanging said handset thereon, so as to effect electrical disconnection of said handset from said system and so that movement of said handset away from said hang-up support will effect electrical connection of said handset to said system.

2. A telephone communication system as recited in claim 1 wherein said transmitter is tuned to a frequency of approximately 39 Khz.

3. A telephone communication system as recited in claim 1 wherein said proximity radio frequency transmitter is mounted closely adjacent to said audio receiver and includes a metal housing which acts as a radiating antenna, and wherein said hang-up support is devoid of movable parts and acts as a receiving antenna for signals emitted from said radiating antenna.

4. A telephone communication system as recited in claim 2 wherein said hang-up support is in the form of a hang-up hook, said hang-up hook being rigidly and insulatingly supported on a front panel of a housing.

5. A telephone communication system as recited in claim 4, said housing including a handset amplifier and a speaker amplifier, both energized by a common power source, a party line and a page line, movement of said handset to close proximity to said hang-up hook effecting disconnection of said handset amplifier from said party and page line.

6. A telephone communication system as recited in claim 5 wherein said proximity detector includes a phase-locked loop detector for detecting signals generated by said radiating antenna when said handset is moved to close proximity to said hang-up hook.

7. A telephone communication system as recited in claim 6 wherein said proximity detector includes an input buffer amplifier used as a voltage follower for for matching said hang-up hook antenna to a low impedance circuit.

* * * * *